UNITED STATES PATENT OFFICE.

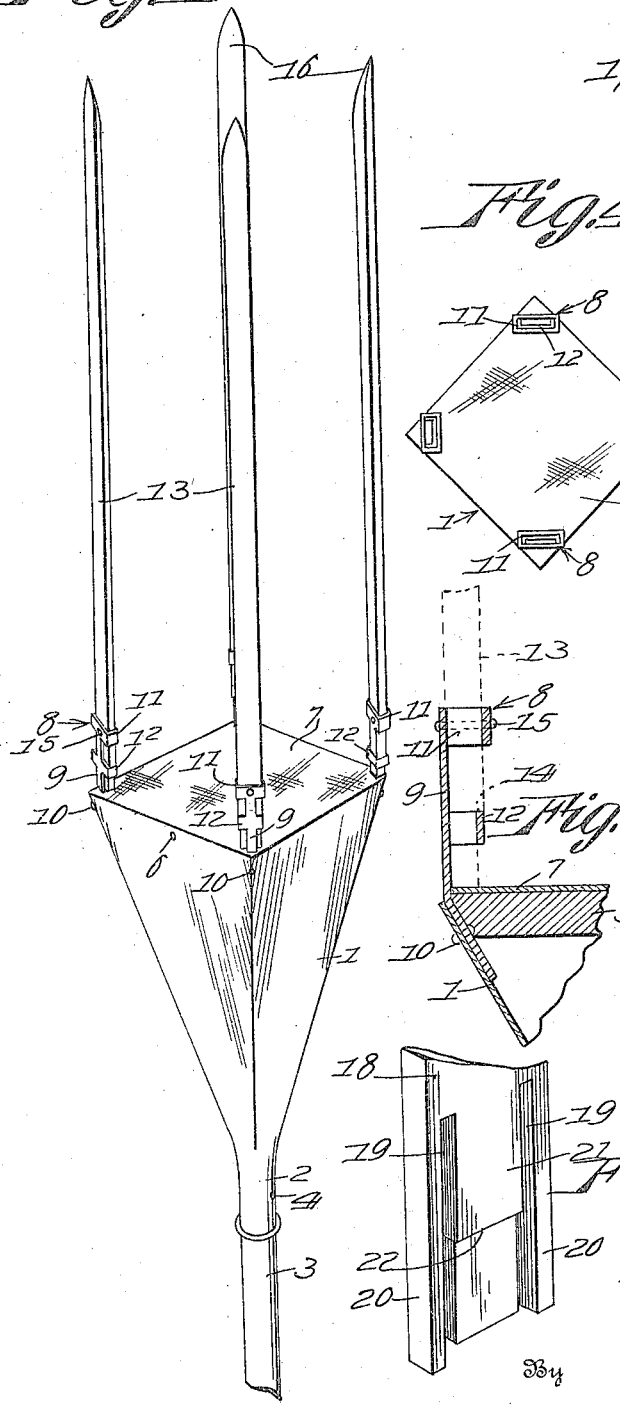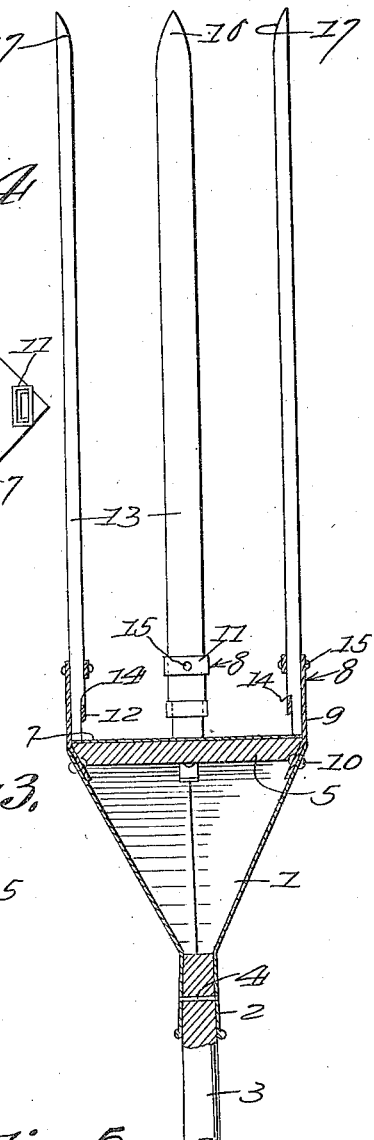

MAGOTARO MATSUZAKA, OF SACRAMENTO, CALIFORNIA.

FRUIT-PICKER.

1,264,835.  Specification of Letters Patent.  Patented Apr. 30, 1918.

Application filed June 1, 1917. Serial No. 172,308.

*To all whom it may concern:*

Be it known that I, MAGOTARO MATSUZAKA, a subject of the Emperor of Japan, residing at Sacramento, in the county of Sacramento and State of California, have invented certain useful Improvements in Fruit-Pickers, of which the following is a specification, reference being had therein to the accompanying drawing.

This invention has reference generally to improvements in that class of inventions known as harvesters, and more particularly relates to a fruit picker.

It is a well known fact that the stems of fruit particularly apples and pears are very brittle and it is the primary aim and object of this invention therefore to provide a fruit picker of such a construction that subsequent to the arrangement of the picker about the apple or pear by moving or twisting the device the apple or pear will be quickly removed from its stem.

It is an additional object of this invention to provide a device of the character described wherein a plurality of apples or pears may be conveniently accommodated therein subsequent to being removed from the trees and subsequent to the arrangement of a number of pieces of fruit in the picker the same can be readily removed therefrom to permit of the continued use of the device.

More particularly this invention embraces the provision of picker arms which are designed and mounted with respect to each other so that they may be readily arranged about a piece of fruit preparatory to moving or twisting the device with a view to breaking the fruit from its stem, the employment of different sized picking arms incidentally facilitating the sorting of the fruit.

Among the other aims and objects of this invention may be recited the provision of a device of the character described with a view to compactness, and in which the number of parts are few, the construction simple, the cost of production low and the efficiency high.

Other improvements and novel details in the construction and arrangement of the various parts of the apparatus will be brought out more in detail in the description to follow, which for a clear understanding of the invention should be considered in connection with the accompanying drawings forming a part hereof, and wherein is disclosed for the purpose of illustration a convenient and satisfactory embodiment of the invention. It is to be noted in this connection that minor changes in the construction and arrangement of parts may be made without departing from the principle of operation of the various parts.

The invention is clearly illustrated in the accompanying drawings, in which:

Figure 1 is a perspective of the invention;
Fig. 2 is a vertical section thereof;
Fig. 3 is a sectional detail;
Fig. 4 is a top plan view;
Fig. 5 is a detail of another form of plucking bar.

Similar characters of reference are employed in all the above described views, to indicate corresponding parts.

Referring now, more particularly, to the accompanying drawings, there is provided a box like frame or casing of an inverted pyramidal form as indicated by the numeral 1, the apex thereof terminating in a ferrule 2 for receiving an elongated handle 3 removably fastened therein through the medium of a securing device 4. A platform 5 is preferably square in configuration and is mounted within the enlarged end of the frame, and is arranged flush with the four edges thereof being removably secured in such position by means of suitable fastening devices 6. A covering or pad 7 is disposed on the outer face thereof and serves as a means for preventing injury to fruit, etc.

With a view toward providing improved means for picking the fruit a plurality of brackets indicated in their entireties by the numeral 8 are employed. Each bracket consists of an upright portion 9, the inner end of which is secured through the medium of a suitable fastening device 10 to the inner surface of the frame adjacent the corner thereof as indicated in the drawings, the diagonally opposed brackets being arranged in spaced parallel relation with respect to each other. A rectangular loop 11 is formed on the upper end of each bracket while a smaller loop 12 is formed intermediate the ends of each bracket on the inner surface of the upright portion and directly beneath the bracket 11. Receivable within the brackets are the fruit picking bars or prongs 13 which are rectangular in cross section and have their extreme inner ends reduced on the inner surfaces and on their side edges forming shoulders 14 for engagement with the corresponding upper edges of the lower loops on the brackets subsequent to passing the bars through the upper loops. The brackets of course support these bars in spaced parallel relation with respect to each other so that they extend upwardly at right angles from the platform as indicated, suitable fastening devices 15 serving to removably retain the bars in position. The outer ends of the bars are preferably pointed as indicated by the numeral 16 and are beveled from their inner surfaces to their outer surfaces as indicated by the numeral 17, the formation of these ends serving to facilitate the passage of the prongs about a piece of fruit. In Fig. 5 there is shown another form of picking bar or prong and in this instance instead of employing the relatively narrow bars 13 wider bars 18 are employed. The inner ends of the bars 18 are provided with spaced inwardly extending slots 19 adjacent the side edges providing arms 20 at the side edges which are arranged in uniformly spaced relation upon opposite sides of the intermediate portion 21 which portion has its inner surfaces and its side edges reduced forming shoulders 22 for engagement with the upper edges of one of the lower loops 12 subsequent to being passed through the upper loop 11 in the brackets.

When in position the side arms 20 of each of the bars 18, are arranged against the outer surfaces of the end portions of the loops 11 and 12, while the space between the outer side edges of the adjacent bars 18 is narrower than the space between the outer side edges of the bars 13 when the latter are mounted in the frame, whereby to permit of the picking of small fruit and the retaining of the same in the device.

The mode of operation of the present invention may be reviewed as follows:

Assuming that the parts have been assembled in the manner described and illustrated in the drawings, it is only necessary to engage the handle 3 and manipulate the same to position the prongs or bars about a piece of fruit whereupon by twisting the handle or moving the handle away from the stem of the fruit, the latter will be broken while the piece of fruit will be retained in the device between the arms and will be prevented from being injured by the pad on the platform. Of course a number of pieces of fruit may be picked and when entirely filled the device may be inverted so that the fruit therein may be deposited in a suitable receptacle.

As many changes could be made in the above construction and many apparently widely different embodiments of this invention could be made without departing from the scope of the invention, it is intended that all matter contained in the above description or shown in the accompanying drawings shall be interpreted as illustrative and not in a limited sense. It is also to be understood that the language used in the following claims is intended to cover all the generic and specific features of the invention herein described and all statements of the scope of the invention which, as a matter of language might be said to fall therebetween.

Having thus fully described this invention, what is claimed as new and desired to be secured by Letters-Patent is:—

1. In a device of the character described including a frame, a handle removably mounted thereon, a platform supported on the frame, brackets carried at the corners of the frame and each including an upright portion and spaced rectangular loops carried by the inner surface of the upright portion, a plurality of fruit picking bars having their inner ends engaged in the loops and their extreme lower terminals engageable with the platform so as to extend at right angles from the outer surface of the platform and in spaced parallel relation with each other, and means for removably fastening the bars in the loops.

2. A device of the character described including a frame of an inverted pyramidal form, a ferrule continuing from the apex thereof, a handle removably mounted in the ferrule, a protective covering on the outer surface of the base of said pyramidal frame, a plurality of brackets mounted at the corners of the outer end of the frame and each including an upright portion and spaced rectangular loops carried by the inner surface thereof, a plurality of picking bars having their lower ends reduced and engaged in the loops so as to be positioned in spaced parallel relation with each other and extending upwardly at right angles to the base and having their outer ends pointed, and means for removably fastening the bars in the loops to prevent accidental displacement of the bars.

In testimony whereof I affix my signature.

MAGOTARO MATSUZAKA.

Copies of this patent may be obtained for five cents each, by addressing the "Commissioner of Patents, Washington, D. C."